United States Patent [19]

Banks et al.

[11] Patent Number: 4,533,170

[45] Date of Patent: Aug. 6, 1985

[54] STROLLER COVER AND SUPPORT FRAME THEREFOR

[76] Inventors: Joseph R. Banks, 1436 Elizabeth Dr.;
Dennis G. Banks, 2042 Boggs Ave.,
both of Pittsburgh, Pa. 15221

[21] Appl. No.: 510,676

[22] Filed: Jul. 5, 1983

[51] Int. Cl.³ .............................................. B60J 9/00
[52] U.S. Cl. ................................. 296/78 A; 296/136; 135/88
[58] Field of Search ...................... 296/78 A, 78 R, 79, 296/81, 82, 83, 136; 135/88

[56] References Cited

U.S. PATENT DOCUMENTS

| | | | |
|---|---|---|---|
| 576,477 | 2/1897 | Silvermann | 135/88 |
| 1,126,236 | 1/1915 | Lees | 296/78 |
| 1,559,352 | 10/1925 | Nelson | 296/78 A |
| 2,218,043 | 10/1940 | Lilleberg | 296/79 |
| 2,648,565 | 8/1953 | Kennedy | 296/78 |
| 2,735,716 | 2/1956 | Shimabukuro | 296/78 |
| 2,789,863 | 4/1957 | Shimabukuro | 296/78 |
| 3,834,756 | 9/1974 | Grell | 296/136 |

*Primary Examiner*—Robert R. Song
*Attorney, Agent, or Firm*—Carothers & Carothers

[57] ABSTRACT

A self supporting frame for a stroller or similar infant conveyance which is resiliently flexed into a deformed self supporting configuration when installed on such an infant conveyance and which, when detached from the infant conveyance, is collapsible into a compact bundle of elongated members.

8 Claims, 4 Drawing Figures

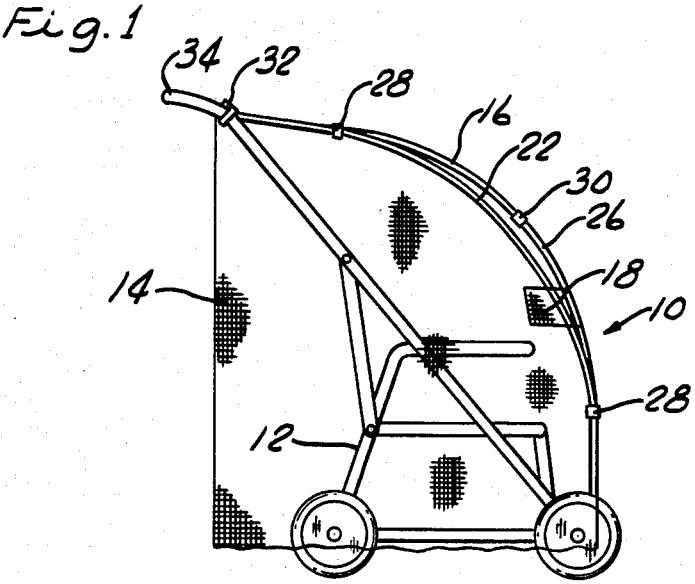
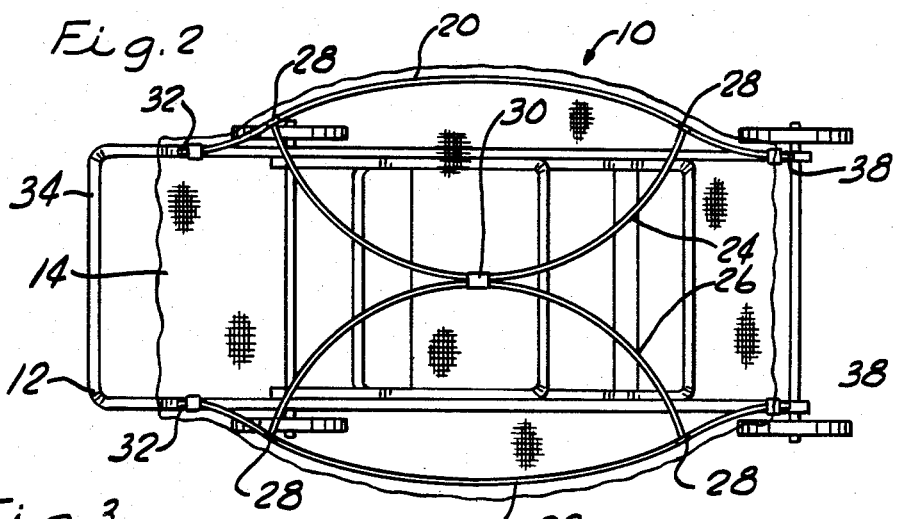
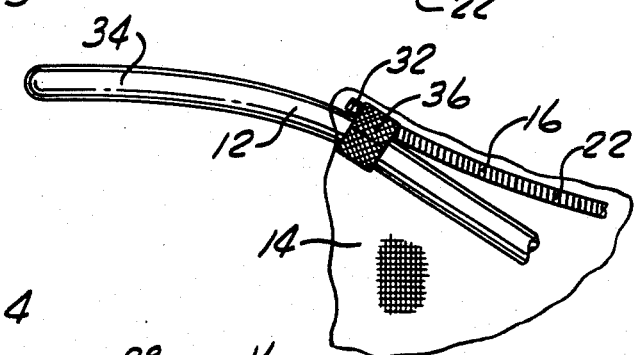
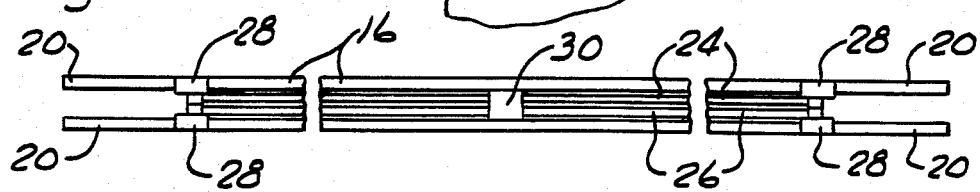

STROLLER COVER AND SUPPORT FRAME THEREFOR

In the art of baby carriages, strollers and other conveyance devices for infants it is well known to provide covers of various sorts to shield the infant riding therein from sun, wind, cold and other elements of the environment. For example, in U.S. Pat. No. 1,126,236 there is disclosed a conventional folding or collapsible hood or canopy for a baby carriage. U.S. Pat. Nos. 2,218,043 and 2,648,565 disclose auxiliary covers for a baby carriage which are supported in part by the canopy structure of the carriage. U.S. Pat. No. 2,735,716 discloses a cover for a stroller, as do U.S. Pat. Nos. 2,789,863 and 3,834,756. In the latter two patents the cover is supported by the structural frame of a conventional stroller canopy, whereas in U.S. Pat. No. 2,735,716 the cover is carried by main structural frame components of the stroller.

Various shortcomings are evident in the prior art. For example, the inability of any given prior cover to be used in conjunction with a wide variety of carriage or stroller designs has limited the utility of prior covers. No prior universal cover designs are known to the inventor herein. In addition, many prior art covers have required support by standard hood or canopy support members of a conventional stroller and were useless with those strollers having no canopy support structure. Likewise, those covers usable with strollers having no canopy were of special design and therefore not usable as auxiliary covers with strollers which do have canopies.

The present invention contemplates an improved cover for a stroller or similar infant conveyance which incorporates a universal, adjustable, self supporting structural frame that is adapted for use with any of a wide variety of stroller designs. The invention, in one presently preferred embodiment thereof, includes a structural frame of flexible rod like members secured together in adjustable fashion. The frame is deformed into a network of resilient bows for attachment to any of a variety of strollers and a cover of clear plastic or the like is supported thereby to protect the stroller occupant from the elements. When not in use the cover support frame may be detached from the stroller and the members thereof, upon release from their bowed configuration, resile to a straight configuration to form a bundle of rod elements. The bundle of rods may be readily coiled for storage in a small pouch or case together with the folded plastic cover.

The invention thus provides a universal cover and self supporting universal frame for a stroller which is easy to mount on a stroller to provide a sturdy cover therefor, and which is readily removable from the stroller and collapsible for convenient storage.

Other objects and advantages appear in the following description and claims.

The accompanying drawings show, for the purpose of exemplification without limiting the invention or the claims thereto, certain practical embodiments illustrating the principles of this invention wherein:

FIG. 1 is a side elevation of a stroller having mounted thereon a cover according to the instant invention;

FIG. 2 is a top plan view of the stroller and cover of FIG. 1;

FIG. 3 is a fragmentary portion of FIG. 1 showing one mode of attachment of the cover frame to a stroller; and FIG. 4 is a view of the frame in its natural or undeformed configuration.

There is generally indicated at 10 in FIGS. 1 and 2 a universal stroller cover mounted upon a stroller 12 to protect an infant riding in the stroller from environmental elements. The stroller 12 is of entirely conventional design and further detailed description thereof is not necessary to an understanding of the present invention. Suffice it to note in this regard that the cover structure of this invention is adapted for use with any of a wide variety of known stroller designs and 'similar conveyances for infants, toddlers and young children.

The cover 10 includes a flexible cover sheet 14 which is suitably formed to be draped over a support frame 16 attached to stroller 12. As shown, cover 14 may be of transparent plastic, for example, and may include ventilation openings such as a screened opening 18.

Frame 16 comprises a network of resilient rod-like elements including a pair of elongated side rods 20 and 22 and a pair of relatively shorter bridging rods 24 and 26. Rod elements 20, 22, 24 and 26 are formed of any suitably flexible and resilient structure such as a tightly coiled spring rods (FIG. 3), reslient plastic or fiberglass rods, or the like, having the capability to provide support for cover 14 when deformed to a bowed configuration. When not constrained in any way, rod elements 20, 22, 24 and 26 resile naturally to a straight configuration as shown in FIG. 4. Furthermore, rod elements 20, 22, 24 and 26 are suitably secured together to provide, when constrained by proper attachment to a stroller, the framework 16 of bowed members to support cover 14, and to provide, when not constrained in any way, a bundle of rods (FIG. 4) which may be readily coiled for convenient storage.

Accordingly, each of rods 20 and 22 has secured thereto at points 28 spaced from the respective ends thereof, the ends of one of rods 24 and 26. The connections at points 28 preferably are hinged connections which allow the ends of rods 24 and 26 a range of motion with respect to respective rods 20 and 22 without deforming the ends of rods 24 and 26. The connections at 28 also preferably may be movable longitudinally of rod elements 20 and 22 for adjustment of the frame 16 in its installed configuration.

Bridging rod elements 24 and 26 are secured together intermediate their ends as at 30 whereby, by flexing rod element 20 and 22 to bow the rods outwardly, a network of interconnected bow elements is formed of the rod elements 20, 22, 24 and 26 to provide the support frame 16 on which cover 14 is supported.

To mount frame 16 upon stroller 12, the upper ends 32 of rod elements 20 and 22 are secured to the stroller adjacent the push handle 34 therefor. The ends 32 of rods 20 and 22 are located at opposite lateral sides of the stroller 12 and are secured to structural members of the stroller (e.g. handle 34) by any suitable means such as velcro ™ fastener strips 36 (FIG. 4) or alternatively, a flexible strip with snap fasteners (not shown). The lower ends 38 of rods 20 and 22 are similarly secured to structural elements adjacent opposite lateral sides of the stroller 12 by attachments similar in all respects to attachments 36 at a location such that each of rod elements 20, 22, 24 and 25 is bowed outwardly to provide the self supporting frame 16. Depending upon the proportions of the stroller and the location of available attachment points for securing the end 32 and 38 of rods 20 and 22 thereto, it may be necessary to adjust the location of connection 28 along the length of rods 20 and 22 to achieve the desired shape or form, and suitable structural integrity for frame 16. It will be readily appreciated that the resilient flexibility of the rod elements 20, 22, 24 and 26 must be judiciously selected to provide the capability of the desired deformable, self supporting structural frame for a variety of stroller designs or physical configurations.

To stow cover 10, frame 16 with plastic cover 14 attached is removed from the stroller 12 by release of attachments 36, whereupon the rod members 20, 22, 24 and 26 tend to resile to their unconstrained straight configuration without any disassembly of frame 16. Any prior adjustment of connections 28 as above described will have to be reversed to permit frame 16 to resile to a completely undeformed state. In said undeformed state (FIG. 4) frame 16 resembles a bundle of rod members which, due to their resilient flexibility may be coiled with the folded plastic cover 14 secured thereto into a compact loop form for storage in a suitable pouch or bag (not shown) which may be adapted to hang from the handle of the stroller, for example.

According to the description hereinabove there is provided by the instant invention an improved stroller cover including a self supporting frame of resiliently deformable members by which the stroller cover is rendered universally adaptable for use with a wide variety of stroller designs. A presently preferred embodiment of the invention having been described herein, it is to be appreciated that the invention may be practiced in numerous alternative and modified embodiments without departing from the broad spirit and scope thereof.

In an alternative embodiment of the invention not shown herein, the bridging elements are rod-like elements extending between the opposite side rods and secured by hinged connections to the flexible side rods. The frame of this alternative embodiment thus resembles, in its free or detached state, a parallelogram and is collapsible by virture of the hinged connections between the side rods and the bridging rods to form a bundle of rod elements which may be readily coiled for easy storage. In its installed configuration, the side rods or the alternative embodiment are bowed outwardly as in the preferred embodiment whereas the bridging rods are not. The bridging rods are nevertheless to be resiliently flexible if it is desired to coil the detached frame for storage.

These and other embodiments and modifications having been envisioned and anticipated by the inventors, the invention is to be construed as broadly as permitted by the scope of the claims appended hereto.

I claim:

1. A support frame adapted for supporting a protective cover with respect to an infant conveyance such as a stroller comprising:
   a plurality of elongated resiliently flexible structural elements;
   said plurality of elongated structural elements including a plurality of elongated resiliently flexible rod elements;
   elongated bridge means interconnecting at least two of said plurality of rod elements which are spaced transversely apart;
   flexible connecting means securing said bridge means with respect to said at least two rod elements in a manner that said frame is collapsible without disassembly thereof to form a bundle of said plurality of elongated resiliently flexible structural elements; and
   securing means cooperable with such an infant conveyance for selectively securing longitudinal end portions of said at least two rod elements to such infant conveyance in a manner that said at least two rod elements are maintained with respect to such infant conveyance in an outwardly bowed configuration and at a transverse spacing determined by said bridge means and by the relative locations of one of said securing means with respect to others of said securing means to provide a self supporting frame for support of such a protective cover with respect to such infant conveyance.

2. The support frame as claimed in claim 1 wherein said bridge means includes at least a pair of interconnected resiliently flexible bridge rods each having the opposite end portions thereo flexibly connected by said flexible connecting means to one of said at least two rod elements.

3. The support frame as claimed in claim 2 wherein said bridge rods are connected to said at least two rod elements in a manner that said bridge rods are maintained in a bowed configuration when said at least two rod elements are being maintained in such outwardly bowed configuration.

4. The support frame as claimed in claim 3 wherein said structural elements are of resiliently deformable plastic.

5. The support frame as claimed in claim 3 wherein said structural elements are of flexible fiberglass.

6. The support frame as claimed in claim 3 wherein said structural elements are flexible coil spring rods.

7. The support frame as claimed in claim 3 wherein said securing means are flexible binding straps having selectively releasable fastener means affixed thereto.

8. The support frame as claimed in claim 3 wherein said bundle of said plurality of elongated resiliently flexible structural elements may be coiled along its length into a compact loop form.

* * * * *